United States Patent [19]

Grunewalder et al.

[11] Patent Number: 5,322,899
[45] Date of Patent: Jun. 21, 1994

[54] FLUOROPOLYMER BLEND FOR COEXTRUSION ONTO THERMOPLASTIC SUBSTRATES

[75] Inventors: John F. Grunewalder, Mequon, Wis.; Mark A. Harley, Oakmont, Pa.

[73] Assignee: PPG Industries, Inc., Pittsburgh, Pa.

[21] Appl. No.: 916,438

[22] Filed: Jul. 21, 1992

[51] Int. Cl.⁵ .................... C08L 27/16; C08L 33/10; C08L 27/06
[52] U.S. Cl. ..................... 525/199; 525/200; 524/520; 428/422
[58] Field of Search ................. 525/199, 200

[56] References Cited

U.S. PATENT DOCUMENTS

| | | | |
|---|---|---|---|
| 3,253,060 | 5/1966 | Koblitz et al. | 260/900 |
| 3,324,069 | 6/1967 | Koblitz et al. | 525/199 |
| 3,458,391 | 7/1969 | Hartley | 525/199 |
| 3,459,834 | 8/1969 | Schmitt | 525/199 |
| 3,524,906 | 8/1970 | Schmitt et al. | 525/199 |
| 3,895,029 | 7/1975 | Ward | 525/199 |
| 4,179,542 | 12/1979 | Christofas et al. | 428/324 |
| 4,317,860 | 3/1982 | Strassel | 428/421 |
| 4,317,861 | 3/1982 | Kidoh et al. | 428/421 |
| 4,364,886 | 12/1982 | Strassel | 264/171 |
| 4,415,519 | 11/1983 | Strassel | 264/171 |
| 4,557,977 | 12/1985 | Memmer et al. | 525/199 |
| 4,585,701 | 4/1986 | Bartoszek et al. | 428/421 |
| 4,615,848 | 10/1986 | Krueger et al. | 525/199 |
| 4,677,017 | 6/1987 | DeAntonis et al. | 428/214 |
| 4,824,911 | 4/1989 | Chu | 525/199 |
| 4,839,409 | 6/1989 | Conroy | 524/179 |
| 5,030,394 | 7/1991 | Sietses et al. | 264/28 |
| 5,030,676 | 7/1991 | Wallen | 524/182 |
| 5,053,176 | 10/1991 | Cameron et al. | 264/75 |
| 5,055,529 | 10/1991 | Kishida et al. | 525/199 |
| 5,130,201 | 7/1992 | Yoshimura et al. | 525/199 |

OTHER PUBLICATIONS

KYNAR ® polyvinylidene fluoride product brochure, Atochem North America, 1990.
GELOY ® acrylic-styrene-acrylonitrile resin brochure, General Electric Co., (date unknown).
ACRYLOID ® acrylic resin brochure, Rohm & Haas Co., (date unknown), pp. 8,9.

Primary Examiner—Carman J. Seccuro, Jr.
Attorney, Agent, or Firm—Dennis G. Millman

[57] ABSTRACT

Adhesion of fluoropolymer capstock layer to thermoplastic substrates such as polyvinyl chloride is achieved without the need for an intermediate adhesive layer while maintaining adequate impact resistance and processing properties by blending with the fluoropolymer a selected combination of acrylic polymers. The fluoropolymer-acrylic polymer blend includes a first acrylic polymer having a major methyl methacrylate monomeric component and a second acrylic polymer having a major ethyl methacrylate component.

10 Claims, No Drawings

FLUOROPOLYMER BLEND FOR COEXTRUSION ONTO THERMOPLASTIC SUBSTRATES

BACKGROUND OF THE INVENTION

This invention relates to improvements in fluoropolymer containing compositions that are adapted to be used, for example as capstock materials to be coextruded onto various substrates.

Coatings and films made from fluoropolymers are known to possess the property of excellent durability under conditions of exterior exposure. Therefore, it has been desired to use fluoropolymers as a protective cap material for less durable, lower cost materials, particularly thermoplastic polymeric materials such as polyvinyl chloride, and pultrusions. However, fluoropolymers have poor adhesion to many polymeric substrates, which has limited the use of fluoropolymers as protective coatings or capping layers. Many attempts have been made to solve this problem, but none have been fully satisfactory. One approach is to employ an intermediate adhesive layer or lamination between the fluoropolymer and the substrate, and examples of this approach can be seen in U.S. Pat. Nos. 4,179,542; 4,317,860; 4,317,861; 4,364,886; 4,415,519; and 4,677,017. Some of these intermediate layers include acrylic polymers. It would be desirable to avoid the additional cost and processing complications entailed by such an intermediate adhesive layer.

U.S. Pat. No. 4,585,701 discloses that adhesion between fluoropolymer-acrylic blends and thermoplastic substrates such as polyvinyl chloride can be improved by incorporating scrap material containing some of the fluoropolymer-acrylic blend into the substrate polymeric mixture. It would be desirable to avoid adding such an additional variable and complication to the extruding process, but instead to achieve adhesion by means of the formulation of the cap stock blend itself.

In order to reduce the melt viscosity of fluoropolymers, another polymer is sometimes blended with the fluoropolymer, particularly acrylic polymers as disclosed in U.S. Pat. No. 3,253,060. Because fluoropolymers are relatively costly, blending it with another resin is also usually advantageous for the sake of lowering the unit cost. Therefore, fluoropolymers used as protective coatings are commonly in the form of blends with acrylic polymers. The fluoropolymer-acrylic blends have heretofore not been found to solve the adhesion problem with respect to polymeric substrates while maintaining adequate impact resistance and processing properties.

Acrylic-styrene-acrylonitrile polymers are known as capstock materials that are coextrudable with polvinyl chloride to form siding, window and door profiles and the like. Although these materials have adequate adhesion to polvinyl chloride substrates, their exterior durability is not as good as fluoropolymers.

SUMMARY OF THE INVENTION

It has now been found that a blend of fluoropolymer with a combination of particular types of acrylic polymers yields surprisingly good combination of adhesion to thermoplastic substrates, impact resistance, and processing properties. The blend comprises 30 to 80 percent of a fluoropolymer component, 5 to 50 percent of a first acrylic polymer component which is the polymerization product of monomers whose major constituent is methyl methacrylate, and 5 to 50 percent of a second acrylic polymer component which is the polymerization product of monomers whose major constituent is ethyl methacrylate- Adhesion to thermoplastic substrates such as polvinyl chloride is attained using this blend without the need for an intermediate adhesive layer. Furthermore, the blend exhibits good durability properties under exterior exposure conditions. The blend is itself thermoplastic and is adaptable to being coextruded with various substrates such as thermoplastic polymers, thereby forming a protective cap on the substrate.

A further surprising result is that good durability is attained even when the capping blend is diluted with lower grade thermoplastic materials, such as the thermoplastic substrate polymer. Typically it had been thought that a fluoropolymer content of at least about 60 to 80 percent was desirable for attaining good exterior durability. Although some prior art disclosures of capstock blends have included broad fluoropolymer ranges lower than the amounts actually found to be practical, amounts lower than 40 percent have not generally been proposed. But with the blend of the present invention, the capping layer may have less than 40 percent fluoropolymer, sometimes less than 35 percent fluoropolymer, and even less than 30 percent fluoropolymer with little or no sacrifice of durability properties. These percentages are on the basis of weight of resin solids.

Detailed Description

The composition of the present invention is not limited to use on particular types of substrates- Although the invention overcomes particular difficulties in capping thermoplastic substrates, it may also be used on other substrates such as metal (e.g., aluminum), wood, and protrusions (typically made from fiber reinforced thermoset resins). The thermoplastic substrates that may be used with the present invention are well known to those of skill in the art and are not limited to particular compositions. A large volume of extruded, thermoplastic products for which the present invention has been found particularly useful use thermoplastic polymers, particularly polymers and copolymers of vinyl chloride. These products include vinyl siding and window and door profiles. "Polyvinyl chloride" as used herein includes homopolymers of vinyl chloride, copolymers of vinyl chloride with one or more different copolymerizable monomer, and blends thereof. Examples of copolymerizable monomers include alpha-olefins having two to eight carbon atoms, alkyl acrylates, vinylidene chloride, vinyl acetate, acrylonitrile, acrylamides, stytenes, substituted stytenes, and the like. Polymers that may be blended with polyvinyl chloride include chlorinated polyethylene, polyacrylates, and chlorosulfonated polyethylene. In addition to the thermoplastic polymer, the thermoplastic substrate may include additives such as ultraviolet radiation absorbers and stabilizers, heat stabilizers, impact resistance modifiers, lubricants, pigments, and fillers. Additional information on polyvinyl chloride compositions for extruded products may be found in U.S. Pat. Nos. 4,839,409 and 5,030,676. An example of extrusion equipment and process may be seen in U.S. Pat. No. 5,053,176.

The capstock material for coextrusion onto a thermoplastic substrate in accordance with the present invention is characterized by good exterior durability due to the inclusion of fluoropolymer- Fluoropolymers include film forming, thermoplastic homopolymers or copolymers of vinyl fluoride, vinylidene fluoride, tetrafluoroethylene, pentafluoropropylene, hexafluoropropylene, and chlorotrifluoroethylene, as well as copolymers of these fluorinated monomers with one or more other monomer such as ethylene, propylene, vinyl chloride, vtnylidene chloride, acrylic and methacrylic acid and lower alkyl esters. Mixtures of fluoropolymers may also be used. A preferred class of polyvinylidene fluorides are sold under the name KYNAR ® by Atochem North America, Phila., Pa. The preferred fluoropolymer for use in the present invention on thermoplastic substrates is KYNAR ®2800, which is a copolymer of vinylidene fluoride and hexafluoropropylene and is characterized by low melting temperature (less than 150° C.), flexibility (greater than 400 percent elongation at break), and high impact strength (greater than 4 foot-pounds per inch as measured by ASTM D256 notched sample method) relative to other typical, commercially available polyvinylidene fluorides. Another type of fluoropolymer that may be used in the present invention is disclosed in U.S. Pat. No. 4,345,057 and is characterized as a copolymer of fluoroolefin, cyclohexyl vinyl ether, alkyl vinyl ether, and hydroxyalkyl vinyl ether, sold under the name "Lumlflon" by Asahi Glass Company.

Because fluoropolymer alone is difficult to process and has poor adhesion to thermoplastic substrates, the capstock material includes acrylic polymeric material blended with the fluoropolymer. At the same time, the fluropolymer-acrylic blend should exhibit good resistance to impact in the final product, compatibility with the coextrusion process, and compatibility with the blending process used to prepare the fluoropolymer-acrylic blend. Making the blend involves melting the fluoropolymer and acrylic polymer mixture, extruding the molten mixture, and cooling and chipping the extruded material into small particles. Poly(methyl methacrylate) homopolymer and copolymers have been blended with fluoropolymers in the prior art, but the resulting blends have been found to be lacking in one or more of the desired properties. Poly(methyl methacrylate) homopolymers exhibit good adhesion, but are too brittle for adequate impact resistance. Copolymers of methymethacrylate, such as ACRYLOID ®B44 sold by Rohra and Haas Co., Phila., Pa., which is an approximately 60% methyl methacrylate/40% ethyl acrylate copolymer, are softer than the homopolymer and therefore provide better impact resistance, but the melt viscosity properties are not suitable for the blending process. In general, softer acrylics also tend to yield poorer adhesion of the blend to thermoplastic substrates.

In the present invention a combination of two acrylic polymers are blended with the fluoropolymer. The first acrylic is predominantly poly(methyl methacrylate), and the second acrylic is predominantly a copolymer of acrylic monomers of which the largest portion is ethyl methacrylate. The first acrylic may be essentially a homopolymer of methyl methacrylate, but minor amounts of other monomers or polymers may be present without substantially altering the properties of that component. Therefore, the first acrylic component may be characterized as a polymerization product of monomers whose major constituent is methyl methacrylate, i.e., more than 50 percent of the monomers by weight of resin solids are methyl methacrylate. Similarly, the second acrylic component may be characterized as a polymerization product of monomers whose major constituent is ethyl methacrylate, i.e., more than 50 percent of the monomers by weight of resin solids are ethyl methacrylate.

Of the fluoropolymer-acrylic polymer blend, it is preferred that 30 to 70 percent by weight of resin solids is fluoropolymer, and the remainder preferably consists of the acrylic polymer combination, although minor amounts of other resins may optionally be present. Less than 30 percent fluoropolymer in the fluoropolymer-acrylic polymer blend is not preferred because only minor amounts of diluent polymer may be used without detrimentally affecting exterior durability of the capstock composition. With greater than 70 percent fluoropolymer, insufficient amounts of the acrylics are present to provide the desired combination of adhesion, impact resistance, and processibility. The ratio of the first acrylic to the second acrylic present in the blend may range from 1:10 to 10:1 (on the basis of weight of resin solids), preferably 1:2 to 2:1, with ratios of about 1:1 being found suitable in the preferred embodiments.

In accordance with conventional practice in the thermoplastic coextrusion art, the capstock formulation (in this case the fluoropolymer-acrylic polymer blend) may be diluted with a less costly polymer or polymer mixture so as to reduce its cost. Preferably, the diluent includes the same thermoplastic polymer contained in the substrate. For example, on polyvinyl chloride substrates, the diluent preferably includes a major portion of polyvinyl chloride, most preferably consisting essentially of polyvinyl chloride. Blending a polymeric diluent into the capstock material that is similar to the polymeric content of the substrate is believed to improve adhesion therebetween. The polyvinyl chloride copolymers and blends disclosed above with regard to the substrate may also be used as the diluent. The amount of diluent may vary widely, ranging from minimal amounts up to amounts at which the properties of the fluoropolymer-acrylic polymer blend begin to be unduly reduced. In the preferred embodiments, the fluoropolymer-acrylic polymer blend typically constitutes between 20 and 90 percent by weight of the resin solids content of the total of the fluoropolymer-acrylic polymer blend and the diluent. For economic reasons, it is preferred that the fluoropolymer-acrylic polymer blend constitutes less than 50 percent by weight of the resin solids content of the total of the fluoropolymer-acrylic polymer blend and the diluent.

At the preferred diluent concentrations described above, the fluoropolymer portion of the total resin solids content of the capstock material may be less than 40 weight percent, sometimes less than 35 weight percent, and even less than 30 weight percent in some cases. Remarkably, at these low levels of fluoropolymer, exterior durability of the capstock material of the present invention has been found to be excellent. Heretofore, fluoropolymer concentrations in the range of at least about 60 to 70 weight percent of total resin solids have been considered necessary in coating compositions in order to attain the exterior durability properties yielded by embodiments of the present invention.

In addition to the resin binder content, the capstock material may include pigments, fillers, lubricants, and other additives as are known in the art. These additional materials generally constitute from 0 to 30 weight percent of the total capstock material. The finished product of a substrate carrying a capstock layer will usually have coloring in the capstock layer, but the colorant pigments or dyes may be added to the capstock blend at the time of coextrusion. Thus, the capstock composition of the present invention need not include colorants even if intended for a colored product. Although the resins and other materials used in the composition of the present invention are 100 percent solids, the presence of minor amounts of solvents is not precluded in the present invention.

The following example illustrates an embodiment of a capstock composition consisting of a fluoropolymer-acrylic polymer blend in accordance with the present invention:

EXAMPLE 1

A fluoropolymer-acrylic polymer blend included the following ingredients:

| Component | Percent by Weight |
| --- | --- |
| "Kynar ® 2800"[1] fluoropolymer | 55.2 |
| "Plexiglas ®-VS100"[2] acrylic polymer | 18.4 |
| "Acryloid ® B72"[3] acrylic polymer | 18.4 |
| Pigments | 7.0 |
| Lubricant[4] | 1.0 |

[1]Vinylidene fluoride, hexafluoropropylene copolymer available from Atochem North America, Philadelphia, Pennsylvania, USA.
[2]Poly(methyl methacrylate) available from Rohm & Haas, Philadelphia, Pennsylvania, USA.
[3]Copolymer of ethyl methacrylate and methyl acrylate in a weight ratio of approximately 3:1, available from Rohm & Haas, Philadelphia, Pennsylvania, USA.
[4]"Kemamide ® E180" stearyl erucamide from Humko Chemical Division of Witco Corporation, Memphis, Tennessee, USA.

The above ingredients were blended in a dry condition and then further processed in a twin screw extruder from Welding Engineers, Inc., set at 400° F. to melt and mix the polymers and to disperse the pigments. The melted blend was then extruded by a NRM Corporation single screw extruder at 450° F. through a die, forming spaghetti-like strands. These strands were water cooled, shaken to remove excess water, and cut with a blade chopping device into small cylindrical pellets measuring approximately ⅛ inch millimeters) long by ⅛ inch (3 millimeters) in diameter.

The pellets were then coextruded with polyvinyl chloride thermoplastic vinyl siding base compound in equipment manufactured by Cincinnati Mildacron in the following manner. The base material was extruded by a twin screw extruder at temperatures ranging from 298° F. (148° C.)to 323° F. (162° C.) along with a top layer formed by coextruding onto the melted base, material processed from the pellets by a second twin screw extruder at temperatures ranging from 322° F. (161° C.) to 371° F. (188° C.). No adhesive layer was used between the substrate and the top layer. The resulting bilayer, having been coextruded through a die was further processed into a vinyl siding-like product by then embossing a simulated wood grain pattern, followed by simultaneous water cooling and forming of the flat web into a three dimensional shingle-like shape. The still continuous sheet was subsequently processed through a series of operations including an air knife, pullers, hole punches, and finally cut to 12 foot lengths for packaging.

The following example illustrates a preferred embodiment of a capstock composition having a fluoropolymer-acrylic polymer blend diluted with polyvinyl chloride in accordance with the present invention.

Example 2

Thirty parts by weight of the pelleted fluoropolymer-acrylic polymer blend of Example 1 were diluted with seventy parts by weight of powdered thermoplastic polyvinyl chloride siding base and mixed together in a dry state. This dry mixture was then coextruded onto melted polyvinyl chloride thermoplastic vinyl siding base compound in a manner similar to that described in Example 1. No adhesive layer was used between the substrate and the top layer.

Test Methods

Gloss

Specular gloss was measured in accordance with the procedure described in ASTM D523-89. Specifically, a Macbeth "NOVO-GLOSS 60° GLOSSMETER" was used on specimens measuring at least 3 inch (7.6 centimeters) by 5 inch (12.7 centimeters). An incident beam of light was directed at the surface of the specimen at an angle of 60° from perpendicular to the plane of the surface of the specimen. A receptor measured the reflected light at the corresponding 60° angle of reflectance. Several readings were taken and averaged. Readings were taken such that the plane of the axes of the incident and reflected beams was parallel to the grain of the simulated wood grain embossing of the sample surface.

Adhesion

Adhesion of the coextruded capping layer to the thermoplastic substrate was measured in accordance with the procedures described in ASTM D3359-90-Specifically, the capping layer was crosscut by a knife into 81 squares each having a size of approximately 2 millimeter by 2 millimeter. One inch (2.5 centimeters) wide masking tape (SM #250) was then applied to the crosscut area and pressed down well with the thumb. The tape was then pulled off rapidly at an angle of approximately 90°. Squares remaining on the substrate were then counted and reported as percent adhesion.

Impact Resistance

The resistance of the sample to the effects of rapid deformation (impact) was measured under guidelines described in ASTM DZ794-90. Specifically, a sample measuring at least 3 inches (7.6 centimeters) by 6 inches (15.2 centimeters) was placed on the panel support, cap layer touching the indenter in an unimpacted area (at least 1.5 inches (3.8 centimeters) from a previously impacted area). The indenter head diameter was 0.065 inches (15-9 millimeters). The weight was raised to a level representing at least a 10 inch-pound impact and allowed to fall. Any failure as exhibited by cracks in the toplayer was noted. This test was repeated at successively higher inch-pound levels. Failure was noted as the level where a hole was actually cut in the test sample. Indentations and tears (splitting) in the sample did not constitute failure.

Weatherability

The exposure test was conducted in a fluorescent ultraviolet light and water condensation exposure apparatus as described in ASTM D4587-91. Specifically, an ultraviolet/condensation apparatus manufactured by the Q-Panel Company, Cleveland, Ohio, USA, was operated with the following weathering cycle: 20 hours light (UVA-340 lamps, manufactured by the Q-Panel Company) at 55° C. followed by 4 hours condensation at 45° C. The percent gloss retention was obtained from the glosses before and after exposure. The color change was measured under guidelines described in ASTM D2244-89. Specifically, color of samples whose dimensions were at least 3 inches (7.6 centimeters) by 4 inches (10.1 centimeters) was measured before and after exposure in the ultraviolet/condensation apparatus. The color measuring device used was a Macbeth Color Eye model #MS2020PL manufactured by Kollmorgen Corporation, Newburgh, N.Y., USA. This device was set for illuminant C, ultraviolet filter in, specular component included, large sample port, 10 degree observer. Color differences were calculated using the Hunter color difference equation.

The performance of the capped vinyl siding products of Examples 1 and 2 was compared with that of a standard commercial polyvinyl chloride siding product made on the same extrusion line with the capstock being based on GELOY® acrylic-styrene-acrylonitrile resin blended with polyvinyl chloride. The comparative example did not include fluoropolymer and did not require an adhesive layer between the substrate and the capstock layer.

TABLE 1

|  | Example 1 | Example 2 | Comparative Example |
| --- | --- | --- | --- |
| Adhesion (%) | 100 | 100 | 100 |
| Color Change (delta E after 1000 hours) | — | 0.25 | 18.75 |
| Color Change (delta E after 3000 hours) | 0.91 | — | 2.20 |
| Gloss Retention (% after 1000 hours) | — | 100 | 58 |
| Gloss Retention (% after 3000 hours) | 100 | — | 27 |
| Coextrusion Processibility | Good | Excellent | Excellent |
| Final Appearance | Good | Excellent | Excellent |
| Impact Resistance (inch-pounds) | 35 | 10* | 45 |

*(Invalid comparison for impact resistance due to omission from this example of additives for improving impact resistance normally included in substrate polyvinyl chloride formulations.)

The comparative tests reported in Table I show that the capstock material of the present invention has excellent adhesion to polyvinyl chloride substrates comparable to that of presently used, non-fluoropolymer capstock materials. However, the durability of the compositions of the present invention (Examples 1 and 2) is dramatically better than that of the comparative prior art composition as shown by the lower color change and higher gloss retention values after simulated exterior exposure.

The invention has been described in connection with specific embodiments for the purpose of setting forth the best mode of the invention, but it should be apparent that other variations and modifications as would be known to those of skill in the art may be resorted to without departing from the scope of the invention as defined by the claims that follow.

We claim:

1. A capstock polymer composition suitable for coextrusion onto thermoplastic substrates, the resinous portion comprising:
    20 to 90 percent of a fluoropolymer-acrylic polymer blend comprising:
        30 to 80 percent of a fluoropolymer component containing polymers or copolymers of fluoroolefin;
        5 to 50 percent of a first acrylic polymer component which consists essentially of methyl methacrylate homopolymer or copolymer consisting essentially of methyl methacrylate with minor amounts of other monomers; and
        5 to 50 percent of a second acrylic polymer components which consists essentially of ethyl methacrylate polymer consisting essentially of a major amount of ethyl methacrylate; and diluent polymeric material comprising vinyl chloride containing polymer.

2. The composition of claim 1 further including pigment.

3. The composition of claim 1 wherein the first acrylic polymer component comprises 10 to 30 percent on a resin solids weight basis of the fluoropolymer-acrylic polymer blend, and the second acrylic polymer component comprises 10 to 30 percent on a resin solids weight basis of the fluoropolymer-acrylic polymer blend.

4. The composition of claim 5 wherein the second acrylic polymer component comprises a copolymer of ethyl methacrylate and methyl acrylate.

5. The composition of claim 6 wherein the copolymer is the polymerization product of about three parts by weight of ethyl methacrylate to each part by weight of methyl acrylate.

6. The composition of claim 1 wherein the first acrylic component and the second acrylic component are present in approximately equal proportions on a resin solids weight basis in the fluoropolymer-acrylic polymer blend.

7. The composition of claim 1 wherein the fluoropolymer-acrylic polymer blend comprises 40 to 65 percent fluoropolymer component on a resin solids weight basis.

8. The composition of claim 1 wherein the major constituent of the fluoropolymer component is polyvinylidene fluoride.

9. The composition of claim 1 wherein the diluent polymeric material comprises polyvinyl chloride.

10. The composition of claim 1 wherein at least 90 percent on a resin solids weight basis of the first acrylic polymer component comprises poly(methyl methacrylate), and at least 90 percent on a resin solids weight basis of the second acrylic polymer component comprises a copolymer of ethyl methacrylate and another alkyl acrylate.

* * * * *